(12) United States Patent
Freudelsperger

(10) Patent No.: US 6,557,693 B1
(45) Date of Patent: May 6, 2003

(54) CONVEYOR SECTION ARRANGEMENT FOR CONTAINERS BEING FILLED WITH ITEMS OR BULK MATERIAL AT A FILLING STATION

(75) Inventor: Karl Freudelsperger, Hart bei Graz (AT)

(73) Assignee: Knapp Logistik Automation GmbH (AU)

( * ) Notice: Subject to any disclaimer, the term of this patent is extended or adjusted under 35 U.S.C. 154(b) by 0 days.

(21) Appl. No.: 09/701,964
(22) PCT Filed: Jun. 3, 1999
(86) PCT No.: PCT/EP99/03857
  § 371 (c)(1),
  (2), (4) Date: Dec. 5, 2000
(87) PCT Pub. No.: WO99/64331
  PCT Pub. Date: Dec. 16, 1999

(30) Foreign Application Priority Data

Jun. 5, 1998 (DE) .......................... 198 25 328

(51) Int. Cl.$^7$ .......................... B65G 47/29; B65B 43/56
(52) U.S. Cl. .............................. 198/461.1; 198/459.6; 198/463.4; 198/579
(58) Field of Search .............................. 198/461.1, 579, 198/459.6, 463.4, 465.1

(56) References Cited

U.S. PATENT DOCUMENTS

| | | | |
|---|---|---|---|
| 2,840,224 A | * 6/1958 | Lefief | 198/461.1 |
| 2,912,092 A | * 11/1959 | Cross et al. | 198/461.1 |
| 3,452,855 A | * 7/1969 | Baker et al. | 198/461.1 |
| 4,124,113 A | * 11/1978 | Trees | 198/476 |
| 4,231,465 A | * 11/1980 | Bourgeois | 198/460 |
| 4,588,391 A | * 5/1986 | Evans et al. | 493/165 |
| 4,945,976 A | * 8/1990 | Ritola | 198/461 |
| 5,275,033 A | * 1/1994 | Rivierre | 198/376 |
| 5,370,162 A | * 12/1994 | Lewis | 198/461 |
| 6,021,887 A | * 2/2000 | Redden | 198/463.4 |
| 6,120,240 A | * 9/2000 | Ghilardi | 198/419.3 |
| 6,202,821 B1 | * 3/2001 | Crockett | 198/530 |

* cited by examiner

Primary Examiner—Douglas Hess
(74) Attorney, Agent, or Firm—McGlew and Tuttle, P.C.

(57) ABSTRACT

The invention relates to an arrangement (1) of a conveyor section (2) for containers (A, B, C, D, E) which are conveyed on said conveyor section and which are to be filled with items (3) or with a bulk material through a filling funnel (5), at a filling station (4). The containers are arranged in a filling position. According to the invention, the conveyor section (2) is configured with at least one circulating synchronous belt drive or chain drive (6) with its own intermittent actuating drive (7) and spaced-out container engagement knobs (8) in the area directly before, at and/or after the filling station (4). Said engagement knobs (8) ensure that the containers (A, B, C, D, E) arriving on the conveyor section (2) with their tops open are individually handled at a faster ate as they are moved into the filling position and, after filling, as they are moved out of the filling position, and can optionally be returned to the conveyor section (2) at the output end.

17 Claims, 8 Drawing Sheets

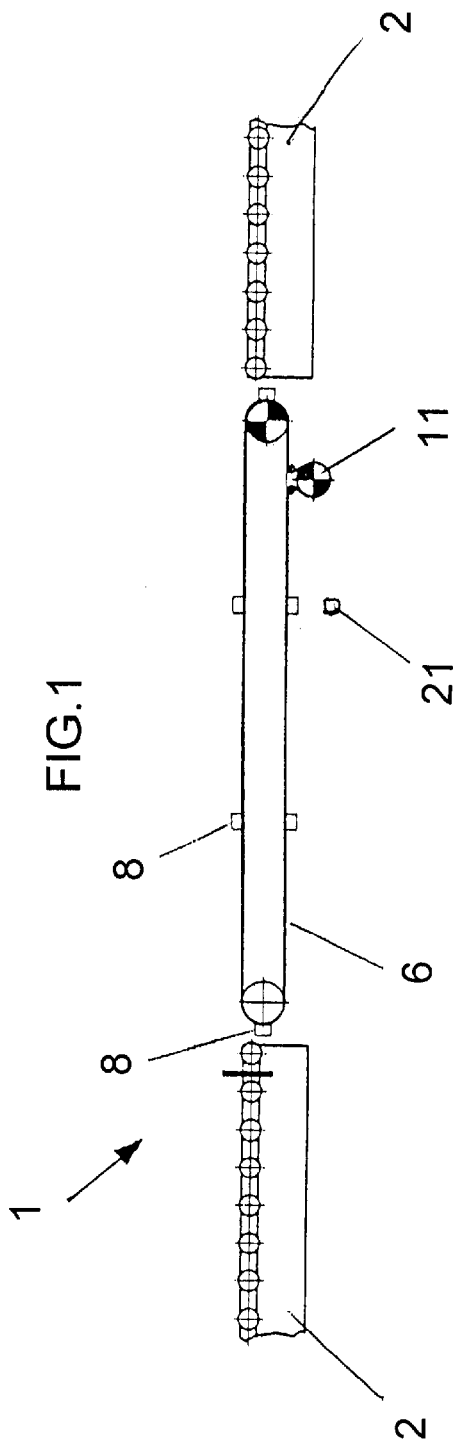
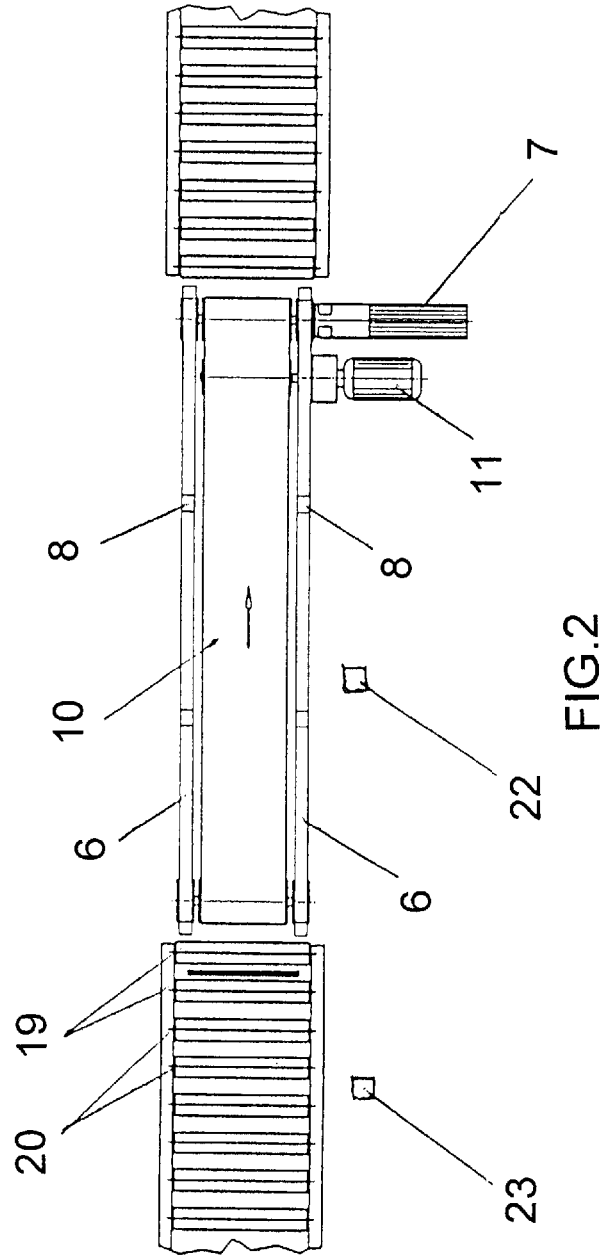

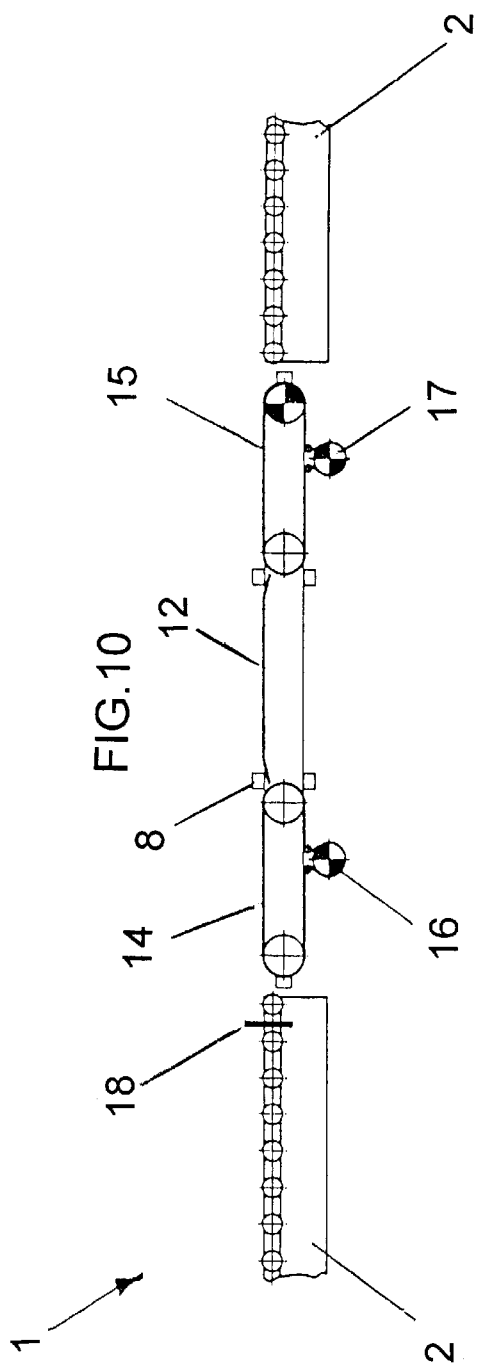
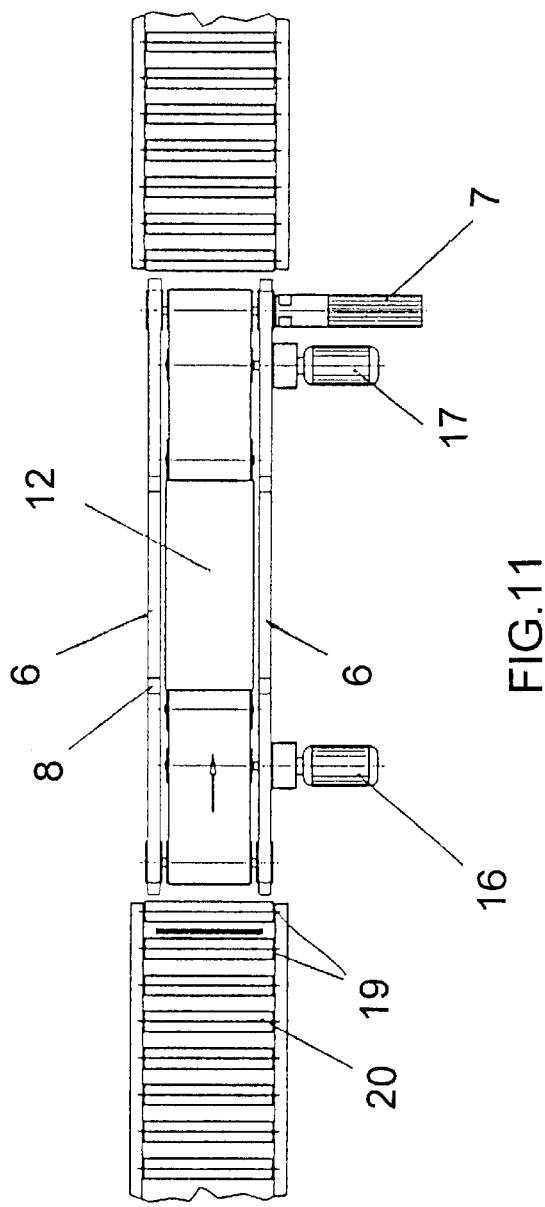

CONVEYOR SECTION ARRANGEMENT FOR CONTAINERS BEING FILLED WITH ITEMS OR BULK MATERIAL AT A FILLING STATION

FIELD OF THE INVENTION

The present invention pertains to an arrangement of a conveying track for containers, which are conveyed on the conveying track, are to be filled with articles or bulk material in a filling station via a feed hopper and are located in the filling position, and especially to the part of an automatic commissioning unit transfer station which feeds the shipping containers to the filling station, positions them under the feed or transfer hopper for the duration of the transfer of the articles or products and subsequently removes them from the filling station.

BACKGROUND OF THE INVENTION

According to the state of the art, the containers are moved in the area of the automatic commissioning unit transfer unit via a continuously running conveyor belt. The separation of the arriving containers is brought about by a clamping device arranged in front of the transfer station, which grasps the container located in the front and allows it to move farther only shortly before the filling station becomes free. A second clamping device, which grasps the arriving container and fixes it until the conclusion of the filling in the correct position, is arranged directly under the filling or transfer hopper arranged downstream of the first clamping device on both sides of the conveyor belt. The filled container is subsequently let go, carried continuously by the driven conveyor belt in a frictionally engaged manner and is removed from the transfer area. The container change time and consequently in many cases the throughput capacity of the entire automatic commissioning unit thus depend on the velocity with which the containers are moved forward cyclically on the conveyor belt in a frictionally engaged manner.

SUMMARY AND OBJECTS OF THE INVENTION

The object of the present invention is to provide an arrangement of the type described in the introduction, which permits a faster movement of the commissioning containers in the area of the filling station with simple means and also permits the accurate positioning of the containers in the filling position under the filling hopper.

According to the invention, an automatic commissioning unit arrangement is provided with a conveying track to and from a filling station for conveying the containers. The containers are open at the top and are filled with articles or bulk material via a feed hopper in a filling station in a stopped filling position. The essence of the present invention is that the conveying track has, in the immediate area before, in and/or after the filling station, at least one circulating toothed belt or chain drive with a separate intermittent adjusting drive and container-engaging knobs located at spaced locations from one another, which can be caused to engage the containers arriving on the conveying track, which are open at the top, and by which the containers can be moved, separated, both into the filling position and, after filling, can be removed from the filling position in an accelerated and cyclic manner and can be optionally moved again into the conveying track by means of the adjusting drive.

The circulating toothed belt or chain drive is preferably arranged on both sides of the conveying track and is axially symmetrical to the conveying track.

In a variant of the embodiment, a single circulating toothed belt or chain drive may be provided in the immediate area before, in and after the filling station with preferably six container-engaging knobs distributed equidistantly from one another over the run.

A single through conveying track may be provided before, in and after the filling station, preferably as a belt conveyor or belt drive, or an interrupted input-side (and/or output-side) conveying track may extend into the filling station and overlap the toothed belt or chain drive in the longitudinal direction of conveyance.

However, the conveying track may also be interrupted, as an alternative, in the area of the circulating toothed belt or chain drive without overlapping the latter, and have a separate belt conveyor or belt drive with a separate drive.

The belt conveyor or belt drive expediently has a stationary upper sliding surface in the area of the filling position, and the belt conveyor or belt drive may be offset downward in parallel via deflecting rollers in the area of the sliding surface.

In another embodiment variant, the conveying track may be interrupted in the area of the circulating toothed or chain drive and have two additional belt conveyors or belt drives with separate drives of their own, wherein one belt conveyor or belt drive is arranged in front of the filling position and the other belt conveyor or belt drive is arranged after the filling position and a stationary sliding surface is arranged in the area of the filling position.

In front of the toothed belt or chain drive, the input-side conveying track preferably has a container-blocking mechanism, which can be placed in the path of movement of the containers being conveyed and can release the path of movement of the containers being conveyed.

The input-side conveying track may be not only a through conveyor belt, but also a driving roller conveyor or an accumulating roller conveyor.

A driving roller conveyor is defined as a frictionally engaged conveyor with continuously driven rollers, which is under the pressure of the objects being conveyed. The frontmost conveyor strikes the above-mentioned container-blocking mechanism in the accumulated position. The accumulated containers lie at closely spaced locations from one another in the frictionally accumulated state.

A (lifting) accumulating roller conveyor is defined as a conveyor not subject to the pressure of the objects with driven rollers, in which the (lifted) containers are at defined spaced locations from one another in the accumulated state and in which the above-mentioned container-blocking mechanism is not absolutely necessary, but it may be advantageously provided for a more accurate positioning.

The container-blocking mechanism is preferably a pneumatically pivotable or displaceable locking bar and is arranged especially between two rollers at the end of the input-side conveying track, which is now preferably designed as an accumulating roller conveyor.

Both rollers may have a larger diameter than the other rollers of the conveying track, in which case they form so-called accelerating rollers. The function of the accelerating rollers arises from the fact that a correspondingly higher circumferential velocity of the last two driving rollers is generated compared with the other rollers due to the difference between the diameters of the drive (small diameter) and the driven rollers (larger diameter), and this higher circumferential velocity removes the frontmost container from the adjacent container in an accelerated manner during the release of the blocking mechanism and brings about a distance from the latter container, so that the released blocking mechanism can again move into the blocking position before the adjacent container is moved on. The frontmost container is thus "separated." The distance generated between the containers is sufficient to allow time, especially for a photoelectric cell, to process a signal for the actuation of the pneumatic blocking mechanism before the arrival of the next container.

Both of the rollers located in the immediate vicinity of the container-blocking mechanism may also have a drive of their own. In this case, this drive can be operated at a higher speed of rotation than the drive of the other rollers in order to establish the abovementioned distance between the containers, and all rollers may have the same diameter.

Thus, the essence of the present invention is that the frictionally engaged carrying of the containers according to the state of the art discussed in the introduction is replaced with a positive-locking carrying, namely, by the container-engaging knobs provided according to the present invention in conjunction with a (slip-free) toothed belt or chain drive with a separate dynamic drive motor, which make it possible, on the one hand, to accurately position or stop the containers in front of or in the filling station while the conveyor belt continuously runs at the same time, and, on the other hand, to grasp behind a stopped container and especially a container filled with articles and to rapidly accelerate same from the stopped position, doing so with the engagement of a container-engaging knob on the rear side of the container, which faces away from the direction of conveying. Since the positioning of the containers takes place in a positive-locking manner rather than by clamping the containers as according to the state of the art, not only comparatively stable containers, e.g., those made of plastic, but also containers made of a more fragile material, e.g., pasteboard, may be used according to the present invention.

It is obvious that the distance in the direction of conveying between two container-engaging knobs is more than half of the length of the container, and preferably slightly more than the length of the container.

It is also obvious that if two lateral, intermittently operated toothed belt or chain drive halves with continuously operated conveyor belt located between them are provided, the distance between two associated container-engaging knobs of each half, which knobs are located at the same level in the direction of conveying, is smaller than the width of the container, so that a container is not rotated but longitudinally offset by the associated engaging lateral knobs during the conveying.

The drive of the toothed belt or chain drive is preferably a dynamic electric motor operator, which is put into operation intermittently by one knob pitch. The belt or the chain is consequently moved farther by one knob pitch, with a comparatively high acceleration, and is subsequently allowed to stop for the duration of the filling of the container under the feed hopper, while the conveyor belt of a through conveying track or of a separate belt drive or conveyor belt located in between continues to move forward. Due to the accelerated feed and removal with simultaneously accurate positioning of a container under the feed hopper, the container change time and consequently the throughput capacity of the entire plant can be nearly doubled compared with the state of the art mentioned in the introduction, doing so without a great effort. The compact design of the conveying track remains unaffected hereby.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic side view of an arrangement of a conveying track of an automatic commissioning unit in the area of the filling station, in which open containers being conveyed on the conveying track are filled with articles or bulk material and are subsequently fed to a shipping station, wherein a separate, continuous belt drive is provided in the filling station, which belt drive extends between two halves of an intermittent toothed belt drive with container-engaging knobs;

FIG. 2 is a schematic top view of the arrangement according to FIG. 1;

FIG. 10 is schematic view of an arrangement of a conveying track similar to FIGS. 1 and 8 in another embodiment variant with two conveyor belts or belt drives in the input area and in the output area of the filling station; and FIG. 11 is a schematic top view, similar to FIGS. 2 and 10, of the arrangement according to FIG. 10.

DESCRIPTION OF THE PREFERRED EMBODIMENTS

Figure 3:
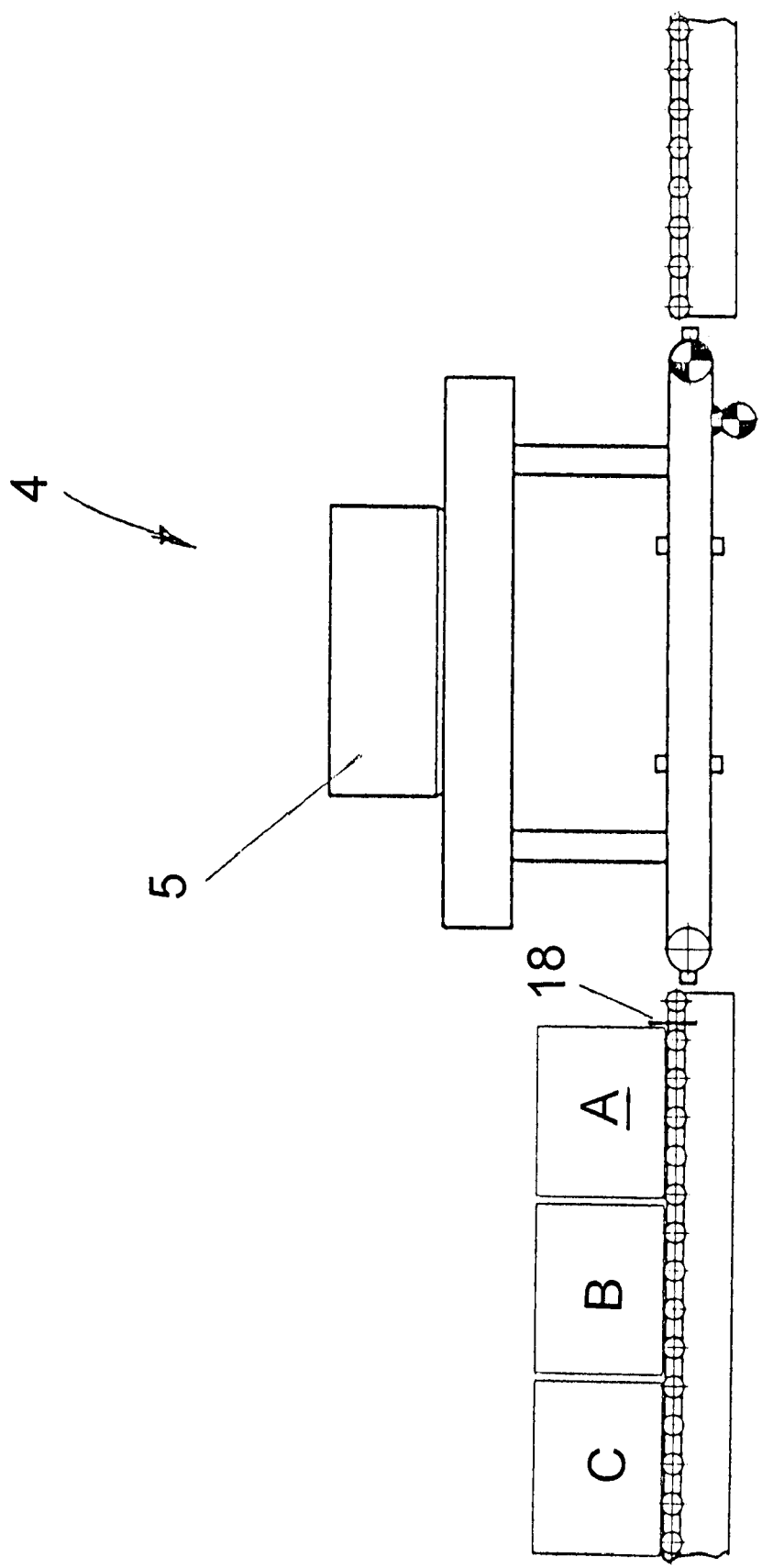
FIG. 3 is an additional schematic view of the arrangement according to FIG. 1 with the filling station and with a view of containers being conveyed or arriving on the conveying track immediately before the filling station.

Referring to the drawings in particular, according to FIGS. 1 through 7, a commissioning unit with, e.g., high-speed automatic turning units, article storage bays, bay-storage and retrieval units, etc. is provided. The commissioning unit is not of particular interest here. The commissioning unit also comprises an arrangement 1 of a conveying track 2 for (shipping) containers or collective boxes from a container storage station to a container shipping station with an intermediate filling station 4, in which commissioned articles 3 or bulk material are filled via a feed hopper 5 into a container, which is open at the top and is conveyed on the conveying track 2, as can be seen especially in FIG. 6.

The conveying track 2, which may be, in principle, e.g., a through conveyor belt, a driving roller conveyor or an accumulating roller conveyor, has, in the immediate area before, in and after the filling station 4, on the right and left, i.e., on both sides of the conveyor belt or the like, a toothed belt or chain drive 6 with a separate dynamic drive in the form of an intermittent adjusting drive 7, which ensures the slip-free cyclic, accelerated movement of one or more containers, which are located in the immediate area of the filling station 4, as will be specifically explained below.

In particular, the toothed belt or chain drive 6 has container-engaging knobs 8 spaced at equidistant locations from one another, six knobs in the exemplary embodiment, by which containers A, B, C, D, E, which are open at the top and are arriving on the conveying track 2, are moved, separated, cyclically and in an accelerated manner, into the filling position and are removed from the filling position after filling in the same manner and are again fed to the conveying track 2 on the output side.

The circulating toothed belt or chain drive 6 is axially symmetrical to the conveying track on both broad sides of the conveying track such that associated knobs 8 on each side in the direction of conveying of the containers are located at the same level or length.

Even though the conveying track 2 as a whole may be designed as a through conveying track, the conveying track 2 is interrupted in the area of the circulating toothed belt or chain drive 6 according to FIGS. 1 and 2 and has in this area a conveyor belt or belt drive 10 of its own with a separate drive 11, which conveyor belt or belt drive is located between the toothed belt or chain drive 6.

The conveying track 2 has, in front of the toothed belt or chain drive 6, a container blocking mechanism 18, which can be placed into the path of movement of the containers being conveyed or can release the path of movement of the containers being conveyed.

The container-blocking mechanism 18 is preferably a pneumatically height-adjustable, especially pivotable or displaceable crossbar, which is located between the last two rollers 19 at the end of the input-side conveying track 2.

The two rollers 19 have a higher circumferential velocity during operation than the other rollers 20 (or deflecting drive rollers) of the input-side conveying track, which is designed as a collecting roller conveyor (or conveyor belt). The two rollers 19 are thus designed as accelerating rollers, and they develop a higher conveying velocity for the containers during the operation than the accumulating roller conveyor (or the conveyor belt). Both the rollers 19 and the other rollers 20 (or circumferential drive rollers) may have a common drive.

However, the two rollers 19 may also have a separate drive. The input-side conveying track may be designed for frictional accumulation or also as an accumulating roller conveyor not subject to the pressure of the articles being conveyed, in which case cyclic movement preferably in the block away from the last accumulation place is correspondingly possible without a container-blocking mechanism and possibly also without accelerating rollers 19 (lifting accumulating roller conveyor).

The function of the conveying track 2 according to FIGS. 1 and 2, which is designed as a driving roller conveyor for frictional accumulation, will be described below on the basis of FIGS. 3 through 7.

According to FIG. 3, the conveying track 2 is blocked immediately before the filling station 4 by a container-blocking mechanism 18. The container-blocking mechanism 18 is located in the elevated position in the path of movement of the containers. The containers C, B, A are in a secured accumulating or waiting position in front of the filling station.

To fill the containers (which are open at the top) with commissioned articles 3, the container-blocking mechanism 18 is released. Due to the last two rollers 19 being driven in the direction of conveying, the container A enters, separated, the input area of the filling station 4.

Figure 4:
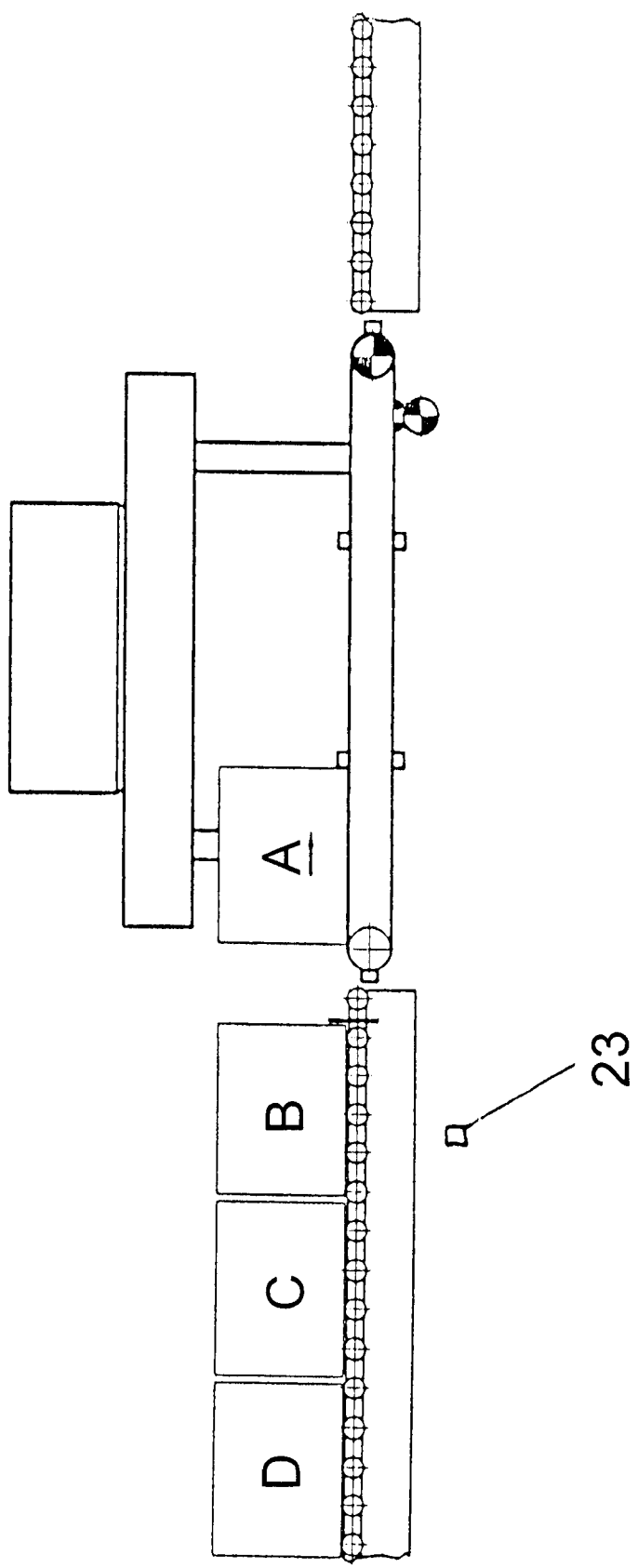
FIG. 4 is a schematic view of the arrangement according to FIG. 3 immediately after the feed of only the frontmost container into the input area of the filling station.

The toothed belt or chain drive 6 is not moving and is located with its six knobs 8 in the position shown in FIG. 4 (two knobs 8 in the roller deflection area, two knobs 8 in the upper strand, which exactly define the filling position aligned with the feed hopper 5, as well as two knobs 8 in the lower strand of the toothed belt drive 6, which are exactly aligned with the knobs 8 in the upper strand).

The separate belt drive 10 between the toothed belt drive 6 is continuously driven by the drive 11.

Due to the above-described mode of operation of the drives 6 and 10, the container A assumes the position shown in FIG. 4, i.e., the belt drive 10 conveys the container A to the stop or, according to the drawing, to the left knob 8 of the upper strand of the toothed belt, and the striking of the container A against the knob 8 is monitored by the suitable integration of the signal of a sensor 23 (especially a trigger photoelectric cell). Since the container A is separated by the driven (accelerating) rollers 19, a distance will become established between the container B located in the accumulation space and the container A, so that the container-blocking mechanism 18 can again be moved into the blocked position according to FIG. 4 as soon as the signal of the sensor 23 (trigger photoelectric cell) has been triggered by the arriving container B, and the container B now strikes the blocking mechanism 18 in the blocked position.

By the toothed belt drive 6 being abruptly put into operation, the container A in FIG. 4 is now moved cyclically away into the filling position according to FIG. 5 by one knob pitch in an accelerated manner, using a suitable sensor system 21, which will be described later. The knob 8 of the deflecting roller, which is the left-hand knob in FIG. 4, now engages the container A in a positive-locking manner behind the container A, so that skidding of the container A on the toothed belt drive during acceleration is reliably prevented from occurring. The same knob 8 will then again form a stop for the next container B being fed in when the toothed belt drive 6 is stopped, and this container B will again enter the filling station 4 after the release of the container-blocking mechanism 18, like the container A described above in connection with FIG. 3.

Figure 5:
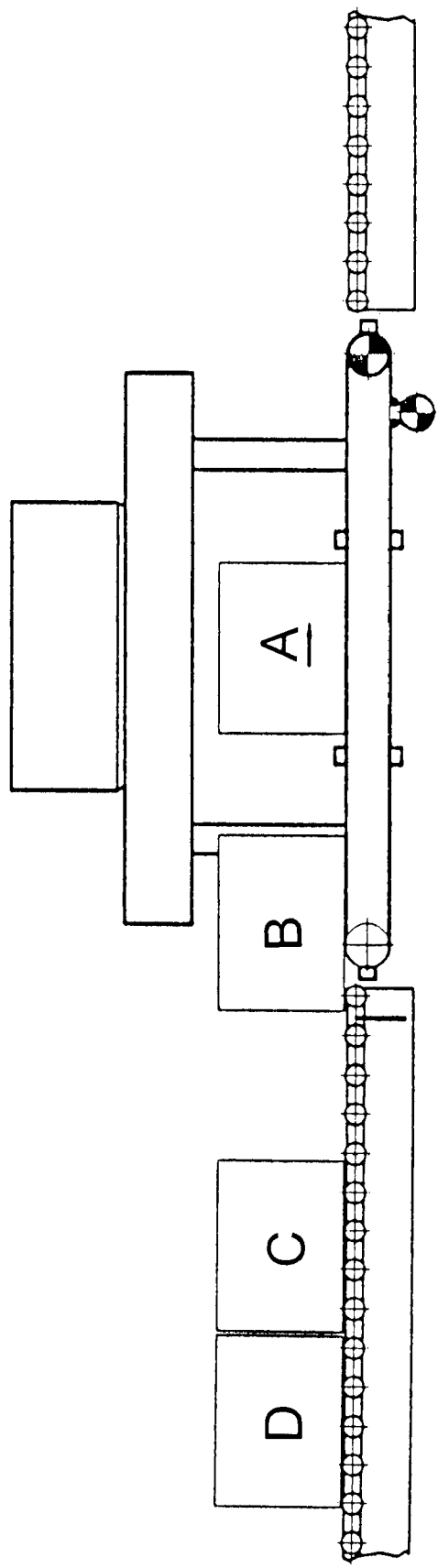
FIG. 5 is a schematic view of the arrangement according to FIG. 4 immediately after an accelerated cyclic movement of the frontmost container into the filling station with positioning of the container under the feed hopper, wherein a container moving up behind is shown at the same time in the input area of the filling station in an intermediate position.
Figure 6:
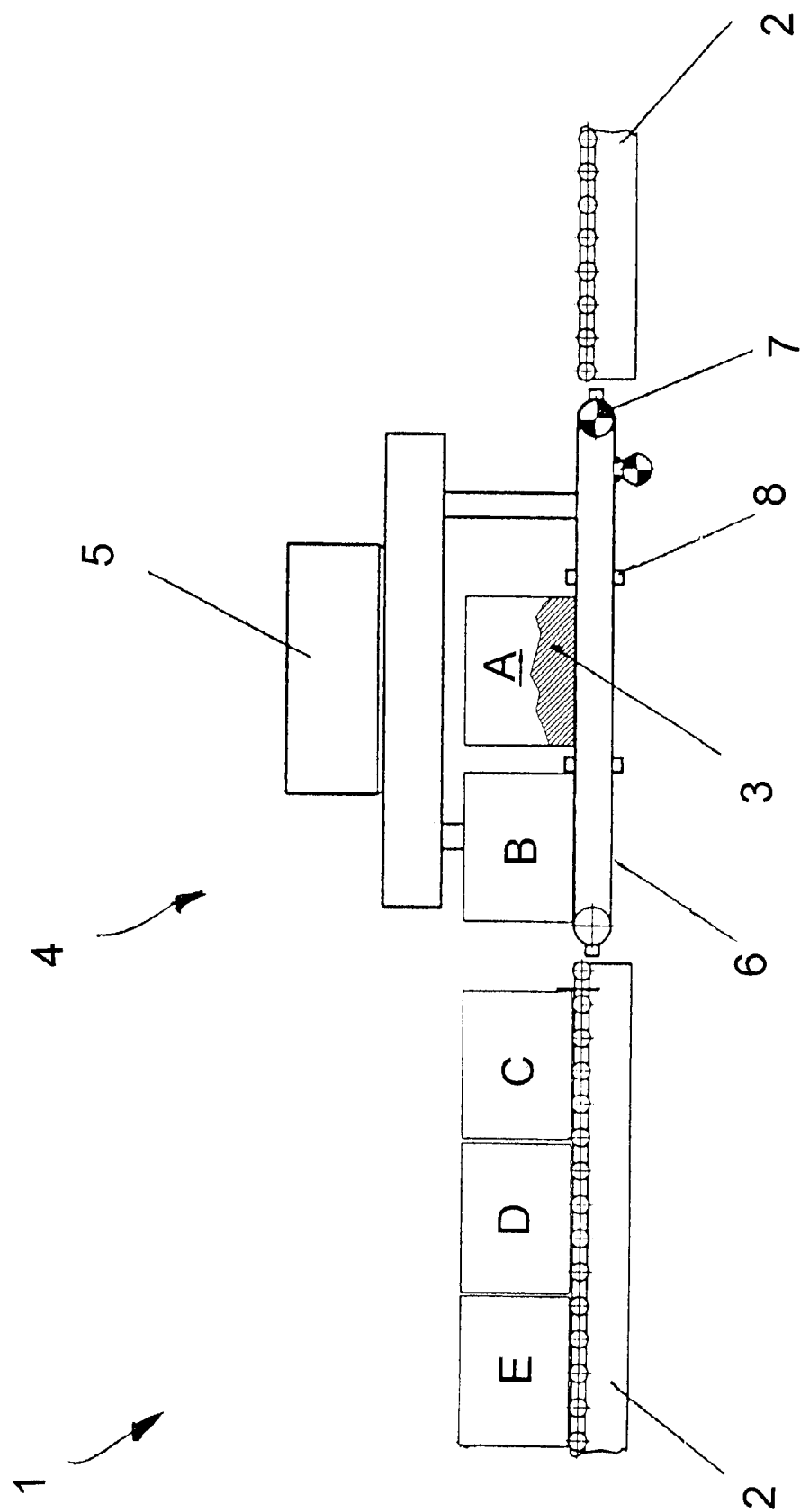
FIG. 6 is a schematic view of the arrangement according to FIG. 5 during the filling of the frontmost container with articles, wherein the container moving up behind has assumed its frontmost stop position in the input area of the filling station.

The container is now filled with articles 3 in the filling position of the container A according to FIG. 5. The container B assumes its stop position according to FIG. 6 in the course of the filling.

Figure 7:
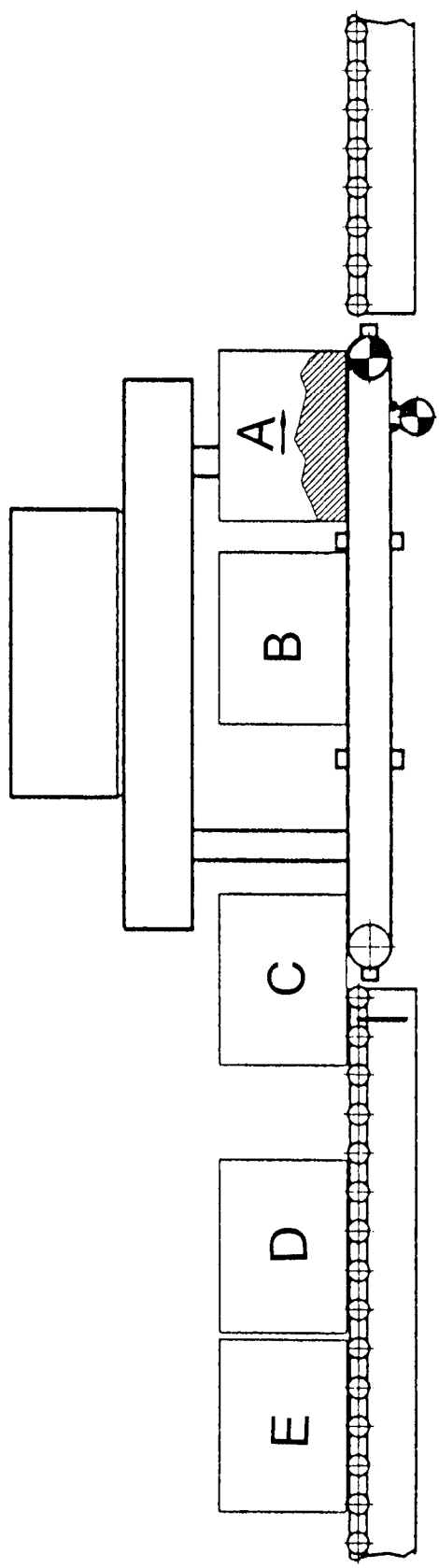
FIG. 7 is a schematic view of the arrangement according to FIG. 6 after the filling of the frontmost container and immediately after an accelerated cyclic movement into the output area of the filling station, wherein the container moving up behind is moved accurately into the filling position in an accelerated manner, and another container moved up behind it into the input area of the filling station.

Once the filling operation has been concluded and the sensor 23 signals the correct position of the container B at the knob 8, the toothed belt or chain drive 6 is again moved cyclically farther by one knob pitch in an accelerated manner, using the above-mentioned sensor system 21, as is shown in FIG. 7.

The sensor system 21 comprises a sensor, which detects a defined position of a knob 8, e.g., the right-hand knob 8 of the lower strand of the toothed belt or chain drive according to FIG. 1. If the sensor (again) detects the presence of a knob at this position, the drive 7 of the toothed belt or chain drive is switched off by means of a signal.

The toothed belt or chain drive 6 is switched on by means of a sensor, not shown, in the area of the feed hopper or in the area of a container located in the filling position, which sensor detects the completely filled state of the container, or by a signal of the computer control, which indicates that the filling operation has been concluded, and then sends a switching signal for the cyclic movement of the drive 7. The latter sensor or signal is also used before to switch off the filling operation.

The essence of the present invention now is that even a full or filled container A with a comparatively heavy weight is moved rapidly to the right without slip or skidding on the support by the associated knob or knobs 8 of the toothed belt or chain drive 6 according to FIG. 7 in a positive-locking manner. The knob pitch is selected to be such that damage to the container is ruled out and the associated accelerating knob grasps behind the container without a jerk. If the knob pitch does not correspond to the length of the container, the knob can move only slowly into an engaged position with the rear side of the container and the container can be fully accelerated only thereafter. Consequently, a related motor operator 7 is controlled correspondingly.

Consequently, the containers can be moved by the present invention extremely rapidly into the filling position in a separated manner and they can also be accurately positioned, without the containers being damaged. The filled containers can also be removed from the filling position extremely rapidly and without being damaged. The passage time of the container in the filling station is consequently determined almost exclusively by the filling operation itself rather than by the transport.

Figure 8:
FIG. 8 is a schematic view of the arrangement of a conveying track according to FIG. 1 with the additional arrangement of a stationary sliding surface in the area of the filling position and additional deflection of the upper strand of the belt drive or conveyor belt under the stationary sliding surface.
Figure 9:
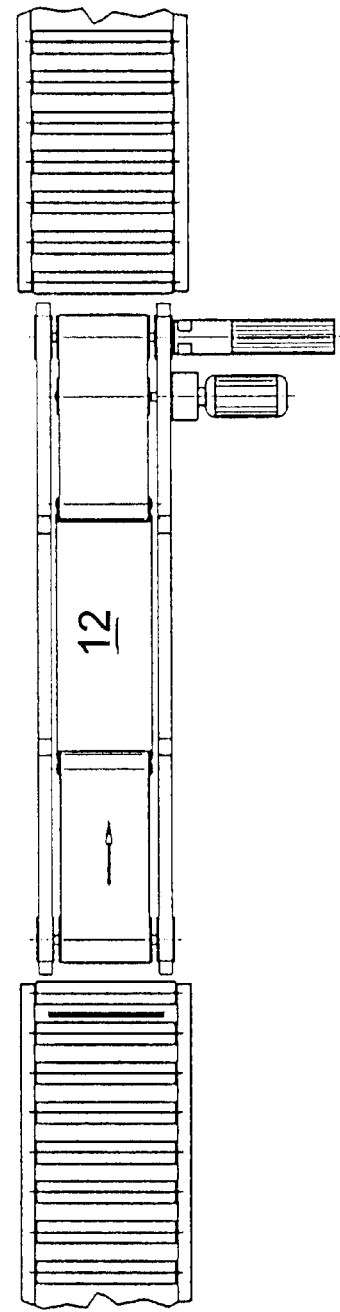
FIG. 9 is a schematic top view, similar to FIG. 2, of the arrangement according to FIG. 8.

In FIGS. 8 and 9, the (continuously operated) belt conveyor or belt drive 10 is additionally provided with a stationary upper sliding surface 12 in the area of the filling position. The belt conveyor or belt drive is offset in parallel downward here by means of deflecting rollers 13 in the area of the sliding surface 12. As a result, a container is located on a solid support during the filling.

In the exemplary embodiment shown in FIGS. 10 and 11, the conveying track 2, which is interrupted in the area of the circulating toothed or chain drive 6, has two belt conveyors or belt drives 14, 15 with a separate drive 16 and 17, respectively. One belt conveyor or belt drive 14 is now located in front of the filling position and the other belt conveyor or belt drive 15 is after the filling position, while a stationary sliding surface 12 as was mentioned above is provided in the immediate area of the filling position. As a result, the input of the filling station can be operated independently from the output, preferably at a different velocity.

It is obvious that all movement processes of the feed movement or removal of containers in the area of the filling station 4 as well as the filling operation itself may be controlled by a central computer of the commissioning unit, and a container reader 21 (e.g., a bar code reader) may be provided in the area of the filling position according to FIG. 2 to recognize a frontmost container and to assign the container to the material to be filled in.

It should also be noted that independently patentable features contained in the subclaims shall have a corresponding independent protection despite the formal reference to the principal claim. All the inventive features contained in all the application documents are also within the scope of protection of the present invention.

While specific embodiments of the invention have been shown and described in detail to illustrate the application of the principles of the invention, it will be understood that the invention may be embodied otherwise without departing from such principles.

What is claimed is:

1. An automatic commissioning unit arrangement, comprising:
   a filling station with a feed hopper and a filling position;
   a conveying track to and from the filling station for conveying containers, which are open at the top and are filled with articles or bulk material via said feed hopper in said filling station in a stopped filling position, said conveying track having, in an immediate area in front of, in and/or after said filling station, at least one circulating toothed belt or chain drive with a dynamic adjusting drive of its own and with container-engaging knobs located at spaced locations from one another and which grasp behind the containers arriving on said conveying track without a jerk and which accelerate the containers in a separated manner both into the filling position and out of the filling position after filling, said input-side conveying track has a container-blocking mechanism in front of said toothed belt or chain drive, said container-blocking mechanism can be placed into the path of movement of the containers being delivered and can release the path of movement of the containers being delivered.

2. An arrangement in accordance with claim 1, wherein said circulating toothed belt or chain drive is arranged on both broad sides of the conveying track and is axially symmetrical to the conveying track.

3. An arrangement in accordance with claim 2, wherein said single circulating toothed belt or chain drive has a plurality of container-engaging knobs spaced at equal distances from one another over the run in the immediate area in front of, in and after said filling station.

4. An arrangement in accordance with claim 1, wherein said single circulating toothed belt or chain drive has a plurality of container-engaging knobs spaced at equal distances from one another over the run in the immediate area in front of, in and after said filling station.

5. An arrangement in accordance with claim 4, wherein said plurality of container-engaging knobs is six knobes.

6. An arrangement in accordance with claim 4, wherein a single through conveying track is provided in front of, in and after said filling station.

7. An arrangement in accordance with claim 6, wherein a single through conveying track is a belt conveyor or belt drive.

8. An arrangement in accordance with claim 4, wherein the conveying track is interrupted in the area of said circulating toothed belt or chain drive and has a separate belt conveyor or belt drive with a drive of its own.

9. An arrangement in accordance with claim 8, wherein an input-side conveying track located in front of said toothed belt or chain drive is a conveyor belt, an accumulating roller conveyor not subject to the pressure of the objects or a driving roller conveyor subject to the pressure of the objects.

10. An arrangement in accordance with claim 4, wherein said conveying track is interrupted in an area of said circulating toothed belt or chain drive and has two additional belt conveyors or belt drive with separate drives, wherein one said belt conveyor or belt drive is arranged in front of the filling position and the other said belt conveyor or belt drive is arranged after the filling position and a stationary sliding surface is provided in the area of said filling station.

11. An arrangement in accordance with claim 1, wherein said container-blocking mechanism is a pneumatically pivotable or displaceable locking bar.

12. An arrangement in accordance with claim 1, wherein said container-blocking mechanism is arranged between two rollers at an end of an input-side conveying track.

13. An arrangement in accordance with claim 12, wherein said two rollers have a higher circumferential velocity during the operation than other rollers or deflecting drive rollers of the input-side conveying track.

14. An arrangement in accordance with claim 13, wherein all of said rollers have a common drive.

15. An arrangement in accordance with claim 12, wherein said two rollers have a drive of their own, wherein said two roller drive can be operated at a higher speed than the drive of said other rollers or said deflecting drive rollers of an input-side conveying track, and all rollers have the same diameter.

16. An arrangement in accordance with claim 1, wherein:
   a pitch of said knobs corresponds to a length of the containers.

17. An automatic commissioning unit arrangement, comprising:
   a filling station with a feed hopper and a filling position;
   a conveying track to and from the filling station for conveying containers, which are open at the top and are filled with articles or bulk material via said feed hopper in said filling station in a stopped filling position, said conveying track having, in an immediate area in front of, in and/or after said filling station, at least one circulating toothed belt or chain drive with a dynamic adjusting drive of its own and with container-engaging knobs located at spaced locations from one another and which grasp behind the containers arriving on said conveying track without a jerk and which accelerate the containers in a separated manner both into the filling position and out of the filling position after filling, said container-engaging knobs being spaced at equal distances from one another over the run in the immediate area in front of in and after said filling station, the conveying track being interrupted in the area of said circulating toothed belt or chain drive and having a separate belt conveyor or belt drive with a drive of its own, said belt conveyor or belt drive having a stationary upper sliding surface in the area of the filling position, wherein the belt conveyor or belt drive may be offset downward in parallel by means of deflecting rollers in the area of said sliding surface.

* * * * *